US009319318B2

United States Patent
Riley et al.

(10) Patent No.: US 9,319,318 B2
(45) Date of Patent: Apr. 19, 2016

(54) METHODS, SYSTEMS, AND COMPUTER READABLE MEDIA FOR PERFORMING PCRF-BASED USER INFORMATION PASS THROUGH

(75) Inventors: Yusun Kim Riley, Weston, MA (US); Uri Baniel, Buffalo Grove, IL (US)

(73) Assignee: TEKELEC, INC., Morrisville, NC (US)

( * ) Notice: Subject to any disclaimer, the term of this patent is extended or adjusted under 35 U.S.C. 154(b) by 436 days.

(21) Appl. No.: 13/048,629

(22) Filed: Mar. 15, 2011

(65) Prior Publication Data

US 2011/0225309 A1 Sep. 15, 2011

Related U.S. Application Data

(60) Provisional application No. 61/313,953, filed on Mar. 15, 2010.

(51) Int. Cl.
*G06F 15/173* (2006.01)
*H04L 12/801* (2013.01)
*H04L 29/06* (2006.01)
*H04W 76/02* (2009.01)

(52) U.S. Cl.
CPC ............ *H04L 47/10* (2013.01); *H04L 63/1408* (2013.01); *H04W 76/022* (2013.01)

(58) Field of Classification Search
CPC ............ H04L 65/1016; H04L 12/1407; H04L 47/2441; H04M 15/66; H04M 2215/208
USPC ......................................... 709/228, 223, 224
See application file for complete search history.

(56) References Cited

U.S. PATENT DOCUMENTS

| | | | |
|---|---|---|---|
| 3,917,915 A | 11/1975 | Karras |
| 4,162,377 A | 7/1979 | Mearns |
| 4,191,860 A | 3/1980 | Weber |
| 4,310,727 A | 1/1982 | Lawser |
| 4,313,035 A | 1/1982 | Jordan et al. |
| 4,385,206 A | 5/1983 | Bradshaw et al. |
| 4,754,479 A | 6/1988 | Bicknell et al. |
| 4,756,020 A | 7/1988 | Fodale |
| 4,769,834 A | 9/1988 | Billinger et al. |
| 4,788,718 A | 11/1988 | McNabb et al. |

(Continued)

FOREIGN PATENT DOCUMENTS

| | | |
|---|---|---|
| CN | 1849787 A | 10/2006 |
| CN | 101589634 A | 11/2009 |

(Continued)

OTHER PUBLICATIONS

ETSI, Policy and Charging Control Over Rx Reference Point, Feb. 2009, 3GPP TS 29.214 version 8.3.0 Release 8.*

(Continued)

*Primary Examiner* — Joon H Hwang
*Assistant Examiner* — Sherman Lin
(74) *Attorney, Agent, or Firm* — Jenkins, Wilson, Taylor & Hunt, P.A.

(57) ABSTRACT

Methods, systems, and computer readable media for performing PCRF-based IP CAN session information pass-through are disclosed. According to one method, a policy and charging rules function (PCRF) receives Internet protocol connectivity access network (IP CAN) session information from an access network-aware gateway. The PCRF forwards at least a portion of the IP CAN session information to a deep packet inspection (DPI) node.

18 Claims, 4 Drawing Sheets

(56) References Cited

U.S. PATENT DOCUMENTS

| | | |
|---|---|---|
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,150,357 A | 9/1992 | Hopner et al. |
| 5,291,481 A | 3/1994 | Doshi et al. |
| 5,315,580 A | 5/1994 | Phaal |
| 5,341,608 A | 8/1994 | Mains, Jr. |
| 5,402,474 A | 3/1995 | Miller et al. |
| 5,426,688 A | 6/1995 | Anand |
| 5,430,709 A | 7/1995 | Galloway |
| 5,438,570 A | 8/1995 | Karras et al. |
| 5,457,692 A | 10/1995 | Ishinabe et al. |
| 5,457,729 A | 10/1995 | Hamann et al. |
| 5,473,596 A | 12/1995 | Garafola et al. |
| 5,475,732 A | 12/1995 | Pester, III |
| 5,506,893 A | 4/1996 | Buscher et al. |
| 5,521,902 A | 5/1996 | Ferguson |
| 5,539,804 A | 7/1996 | Hong et al. |
| 5,546,398 A | 8/1996 | Tucker et al. |
| 5,550,914 A | 8/1996 | Clarke et al. |
| 5,572,579 A | 11/1996 | Orriss et al. |
| 5,579,371 A | 11/1996 | Aridas et al. |
| 5,583,926 A | 12/1996 | Venier et al. |
| 5,586,177 A | 12/1996 | Farris et al. |
| 5,592,530 A | 1/1997 | Brockman et al. |
| 5,598,464 A | 1/1997 | Hess et al. |
| 5,602,909 A | 2/1997 | Carkner et al. |
| 5,606,600 A | 2/1997 | Elliott |
| 5,610,969 A | 3/1997 | McHenry et al. |
| 5,610,977 A | 3/1997 | Williams et al. |
| 5,625,681 A | 4/1997 | Butler, II |
| 5,689,555 A | 11/1997 | Sonnenberg |
| 5,696,816 A | 12/1997 | Sonnenberg |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,802,145 A | 9/1998 | Farris et al. |
| 5,812,639 A | 9/1998 | Bartholomew et al. |
| 5,867,558 A | 2/1999 | Swanson |
| 5,903,726 A | 5/1999 | Donovan et al. |
| 5,949,871 A | 9/1999 | Kabay et al. |
| 5,999,525 A | 12/1999 | Krishnaswamy et al. |
| 6,009,160 A | 12/1999 | Sonnenberg |
| 6,021,126 A | 2/2000 | White et al. |
| 6,028,914 A | 2/2000 | Lin et al. |
| 6,091,957 A | 7/2000 | Larkins et al. |
| 6,091,959 A | 7/2000 | Souissi et al. |
| 6,094,573 A | 7/2000 | Heinonen et al. |
| 6,097,719 A | 8/2000 | Benash et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,754 A | 9/2000 | Landgren |
| 6,119,014 A | 9/2000 | Alperovich et al. |
| 6,128,304 A | 10/2000 | Gardell et al. |
| 6,128,377 A | 10/2000 | Sonnenberg |
| 6,134,307 A | 10/2000 | Broukman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,138,023 A | 10/2000 | Agarwal et al. |
| 6,141,686 A | 10/2000 | Jackowski et al. |
| 6,181,937 B1 | 1/2001 | Joensuu |
| 6,182,086 B1 | 1/2001 | Lomet et al. |
| 6,188,752 B1 | 2/2001 | Lesley |
| 6,208,872 B1 | 3/2001 | Schmidt |
| 6,215,790 B1 | 4/2001 | Voit et al. |
| 6,219,551 B1 | 4/2001 | Hentilä et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,301,609 B1 | 10/2001 | Aravamudan et al. |
| 6,304,565 B1 | 10/2001 | Ramamurthy |
| 6,321,268 B1 | 11/2001 | Dillon et al. |
| 6,324,183 B1 | 11/2001 | Miller et al. |
| 6,333,931 B1 | 12/2001 | LaPier et al. |
| 6,363,411 B1 | 3/2002 | Dugan et al. |
| 6,373,930 B1 | 4/2002 | McConnell et al. |
| 6,393,269 B1 | 5/2002 | Hartmaier et al. |
| 6,424,621 B1 | 7/2002 | Ramaswamy et al. |
| 6,430,176 B1 | 8/2002 | Christie, IV |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,496,690 B1 | 12/2002 | Cobo et al. |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,584,183 B2 | 6/2003 | Manto |
| 6,611,516 B1 | 8/2003 | Pirkola et al. |
| 6,633,764 B1 | 10/2003 | Garcia |
| 6,651,101 B1 | 11/2003 | Gai et al. |
| 6,661,780 B2 | 12/2003 | Li |
| 6,718,178 B1 | 4/2004 | Sladek et al. |
| 6,747,970 B1 | 6/2004 | Lamb et al. |
| 6,760,343 B1 | 7/2004 | Krishnamurthy et al. |
| 6,801,781 B1 | 10/2004 | Provost et al. |
| 6,856,676 B1 | 2/2005 | Pirot et al. |
| 6,880,005 B1 | 4/2005 | Bell et al. |
| 6,963,583 B1 | 11/2005 | Foti |
| 6,968,052 B2 | 11/2005 | Wullert, II |
| 7,058,036 B1 | 6/2006 | Yu et al. |
| 7,209,962 B2 | 4/2007 | Boden |
| 7,289,498 B2 | 10/2007 | Yu et al. |
| 7,333,809 B2 | 2/2008 | Engelhart |
| 7,581,249 B2 | 8/2009 | Bussiere et al. |
| 7,719,966 B2 | 5/2010 | Luft et al. |
| 7,940,683 B2 | 5/2011 | Dolganow et al. |
| 8,005,087 B2 | 8/2011 | Dolganow et al. |
| 8,042,148 B2 | 10/2011 | Andreasen et al. |
| 8,131,831 B1 | 3/2012 | Hu |
| 8,146,133 B2 | 3/2012 | Moon et al. |
| 8,159,941 B2 | 4/2012 | Dolganow et al. |
| 8,250,646 B2 | 8/2012 | Zheng |
| 8,429,268 B2 | 4/2013 | Riley et al. |
| 8,433,794 B2 | 4/2013 | Baniel et al. |
| 8,458,767 B2 | 6/2013 | Riley et al. |
| 8,467,291 B2 | 6/2013 | Lövsén et al. |
| 8,595,368 B2 | 11/2013 | Baniel et al. |
| 8,606,222 B2 | 12/2013 | Agarwal et al. |
| 8,620,263 B2 | 12/2013 | Ravishankar et al. |
| 8,640,188 B2 | 1/2014 | Riley et al. |
| 8,718,075 B2 | 5/2014 | Cai et al. |
| 8,813,168 B2 | 8/2014 | Riley et al. |
| 9,166,803 B2 | 10/2015 | Riley et al. |
| 2001/0031641 A1 | 10/2001 | Ung et al. |
| 2001/0034224 A1 | 10/2001 | McDowell et al. |
| 2002/0029189 A1 | 3/2002 | Titus et al. |
| 2002/0052806 A1 | 5/2002 | Hodson et al. |
| 2002/0058507 A1 | 5/2002 | Valentine et al. |
| 2002/0111153 A1 | 8/2002 | Hartmaier et al. |
| 2002/0143914 A1 | 10/2002 | Cihula |
| 2002/0150079 A1 | 10/2002 | Zabawskyj et al. |
| 2002/0188562 A1 | 12/2002 | Igarashi et al. |
| 2003/0026289 A1 | 2/2003 | Mukherjee et al. |
| 2003/0031160 A1 | 2/2003 | Gibson Ang et al. |
| 2003/0037108 A1 | 2/2003 | Peiffer et al. |

(56) References Cited

U.S. PATENT DOCUMENTS

| | | |
|---|---|---|
| 2003/0177281 A1 | 9/2003 | McQuillan et al. |
| 2003/0203740 A1 | 10/2003 | Bahl et al. |
| 2003/0208523 A1 | 11/2003 | Gopalan et al. |
| 2004/0003037 A1 | 1/2004 | Fujimoto et al. |
| 2004/0106393 A1 | 6/2004 | Chowdhury et al. |
| 2004/0111519 A1 | 6/2004 | Fu et al. |
| 2004/0153506 A1 | 8/2004 | Ito et al. |
| 2004/0166878 A1 | 8/2004 | Erskine et al. |
| 2004/0176086 A1 | 9/2004 | Chatterjee et al. |
| 2004/0213393 A1 | 10/2004 | Bedingfield et al. |
| 2004/0233840 A1 | 11/2004 | Bye |
| 2004/0240638 A1 | 12/2004 | Donovan |
| 2005/0027867 A1 | 2/2005 | Mueller et al. |
| 2005/0070310 A1 | 3/2005 | Caspi et al. |
| 2005/0088977 A1 | 4/2005 | Roch et al. |
| 2005/0122945 A1 | 6/2005 | Hurtta |
| 2005/0202836 A1 | 9/2005 | Schaedler et al. |
| 2006/0013191 A1 | 1/2006 | Kavanagh |
| 2006/0025114 A1 | 2/2006 | Bales et al. |
| 2006/0174012 A1 | 8/2006 | Yamazaki et al. |
| 2006/0233101 A1 | 10/2006 | Luft et al. |
| 2006/0291486 A1 | 12/2006 | Cai et al. |
| 2006/0291488 A1 | 12/2006 | Naqvi et al. |
| 2007/0004393 A1 | 1/2007 | Forsberg et al. |
| 2007/0066286 A1 | 3/2007 | Hurtta |
| 2007/0121812 A1 | 5/2007 | Strange et al. |
| 2007/0159976 A1 | 7/2007 | Dekeyzer et al. |
| 2007/0185809 A1 | 8/2007 | Duan |
| 2007/0220251 A1 | 9/2007 | Rosenberg et al. |
| 2007/0226775 A1 | 9/2007 | Andreasen et al. |
| 2007/0242692 A1 | 10/2007 | Limb et al. |
| 2007/0286117 A1 | 12/2007 | Balasubramanian et al. |
| 2008/0046963 A1 | 2/2008 | Grayson et al. |
| 2008/0076388 A1 | 3/2008 | Nochimowski et al. |
| 2008/0120700 A1 | 5/2008 | Pandey et al. |
| 2008/0137541 A1 | 6/2008 | Agarwal et al. |
| 2008/0160954 A1 | 7/2008 | Agarwal et al. |
| 2008/0201772 A1 | 8/2008 | Mondaeev et al. |
| 2008/0232376 A1 | 9/2008 | Huang et al. |
| 2008/0263631 A1* | 10/2008 | Wang et al. ............... 726/2 |
| 2008/0276305 A1 | 11/2008 | Chan et al. |
| 2008/0313708 A1 | 12/2008 | Khan et al. |
| 2008/0316971 A1 | 12/2008 | Shaheen |
| 2009/0089418 A1 | 4/2009 | Saha et al. |
| 2009/0141625 A1 | 6/2009 | Ghai et al. |
| 2009/0177650 A1* | 7/2009 | Petersson et al. ............ 707/5 |
| 2009/0196225 A1 | 8/2009 | Avila Gonzalez et al. |
| 2009/0222538 A1 | 9/2009 | Takahashi et al. |
| 2009/0227231 A1 | 9/2009 | Hu et al. |
| 2009/0228956 A1 | 9/2009 | He et al. |
| 2009/0282225 A1 | 11/2009 | Caprioli et al. |
| 2009/0285225 A1* | 11/2009 | Dahod ............... 370/401 |
| 2009/0307028 A1 | 12/2009 | Eldon et al. |
| 2009/0323536 A1 | 12/2009 | Liu et al. |
| 2009/0327112 A1 | 12/2009 | Li et al. |
| 2010/0039941 A1 | 2/2010 | Tan et al. |
| 2010/0040047 A1 | 2/2010 | Zamora et al. |
| 2010/0121960 A1 | 5/2010 | Baniel et al. |
| 2010/0142373 A1 | 6/2010 | Jin et al. |
| 2010/0184403 A1 | 7/2010 | Cai et al. |
| 2010/0185488 A1 | 7/2010 | Hogan et al. |
| 2010/0186064 A1 | 7/2010 | Huang et al. |
| 2010/0217877 A1 | 8/2010 | Willars et al. |
| 2010/0235877 A1 | 9/2010 | Hu et al. |
| 2011/0003579 A1 | 1/2011 | Cai et al. |
| 2011/0022702 A1 | 1/2011 | Riley et al. |
| 2011/0022722 A1 | 1/2011 | Castellanos Zamora et al. |
| 2011/0041182 A1 | 2/2011 | Stenfelt |
| 2011/0111767 A1 | 5/2011 | Livanos |
| 2011/0167471 A1 | 7/2011 | Riley et al. |
| 2011/0170412 A1 | 7/2011 | Ramadas et al. |
| 2011/0202653 A1 | 8/2011 | Riley et al. |
| 2011/0219426 A1 | 9/2011 | Kim et al. |
| 2011/0225280 A1 | 9/2011 | Delsesto et al. |
| 2011/0225306 A1 | 9/2011 | Delsesto et al. |
| 2011/0246586 A1 | 10/2011 | Steele |
| 2011/0296489 A1 | 12/2011 | Fernandez Alonso et al. |
| 2012/0034900 A1 | 2/2012 | Agarwal |
| 2012/0084425 A1 | 4/2012 | Riley et al. |
| 2012/0099715 A1 | 4/2012 | Ravishankar et al. |
| 2012/0129488 A1 | 5/2012 | Patterson et al. |
| 2012/0131165 A1 | 5/2012 | Baniel et al. |
| 2012/0144049 A1 | 6/2012 | Lopez Nieto et al. |
| 2012/0163297 A1 | 6/2012 | Agarwal et al. |
| 2013/0017803 A1 | 1/2013 | Li et al. |

FOREIGN PATENT DOCUMENTS

| | | |
|---|---|---|
| CN | ZL200780051876.7 | 10/2013 |
| CN | ZL200980130515.0 | 2/2015 |
| CN | ZL 201180017408.4 | 2/2015 |
| CN | ZL201180013382.6 | 5/2015 |
| EP | 0 088 639 A2 | 9/1983 |
| EP | 0 212 654 A2 | 3/1987 |
| EP | 0 258 654 A2 | 3/1988 |
| EP | 0 264 023 A2 | 4/1988 |
| EP | 1 100 279 A2 | 5/2001 |
| EP | 1 501 242 A2 | 1/2005 |
| EP | 1 551 144 A1 | 7/2005 |
| EP | 1 657 848 A1 | 5/2006 |
| EP | 2 045 974 A1 | 4/2009 |
| EP | 2 289 283 B1 | 2/2014 |
| EP | 2 116 021 B1 | 2/2015 |
| GB | 2 382 267 | 5/2003 |
| JP | 58-215164 A | 12/1983 |
| JP | 62-200859 A | 9/1987 |
| KR | 1020030025024 A | 3/2003 |
| KR | 10-2006-0028042 | 3/2006 |
| KR | 10-2009-0027861 | 3/2009 |
| WO | WO 84/01073 A1 | 3/1984 |
| WO | WO 86/03915 A1 | 7/1986 |
| WO | WO 88/00419 A1 | 1/1988 |
| WO | WO 97/33441 A1 | 9/1997 |
| WO | WO 99/14910 A1 | 3/1999 |
| WO | WO 00/16583 A1 | 3/2000 |
| WO | WO 00/35155 A1 | 6/2000 |
| WO | WO 01/20920 A1 | 3/2001 |
| WO | WO 01/56308 A2 | 8/2001 |
| WO | WO 02/052834 A1 | 7/2002 |
| WO | WO 03/017697 A1 | 2/2003 |
| WO | WO 2005/033841 A2 | 4/2005 |
| WO | WO 2006/031678 A2 | 3/2006 |
| WO | WO 2007/092573 A2 | 8/2007 |
| WO | WO 2008/000287 A1 | 1/2008 |
| WO | WO 2008/085432 A1 | 7/2008 |
| WO | WO 2008/114217 A1 | 9/2008 |
| WO | WO 2008/131689 A1 | 11/2008 |
| WO | WO 2009/149341 A2 | 12/2009 |
| WO | WO 2010/086013 A1 | 8/2010 |
| WO | WO 2011/011790 A2 | 1/2011 |
| WO | WO 2011/082036 A2 | 7/2011 |
| WO | WO 2011/100684 A2 | 8/2011 |
| WO | WO 2011/109821 A2 | 9/2011 |
| WO | WO 2011/115991 A2 | 9/2011 |

OTHER PUBLICATIONS

Notice of Allowance and Fee(s) Due for U.S. Appl. No. 13/225,390 (Oct. 9, 2012).

European Search Report for European Patent Application No. EP 09 75 9499 (Sep. 12, 2012).

3rd Generation Partnership Project, "Technical Specification Group Core Network and Terminals; Policy and Charging Control over Gx Reference Point," 3GPP TS 29.212, V8.0.0, Release 8 (May 2008).

Non-Final Official Action for U.S. Appl. No. 12/479,179 (Sep. 13, 2012).

Non-Final Official Action for U.S. Appl. No. 12/973,186 (Aug. 24, 2012).

Applicant-Initiated Interview Summary for U.S. Appl. No. 13/225,390 (Aug. 13, 2012).

Non-Final Official Action for U.S. Appl. No. 13/042,294 (Jun. 20, 2012).

(56) References Cited

OTHER PUBLICATIONS

Notice of Allowance and Fee(s) Due for U.S. Appl. No. 12/621,190 (May 29, 2012).
Non-Final Official Action for U.S. Appl. No. 13/225,390 (May 14, 2012).
Communication of European publication number and information on the application of Article 67(3) EPC for European Application No. 10803020.6 (May 4, 2012).
Final Official Action for U.S. Appl. No. 12/479,179 (Apr. 10, 2012).
First Office Action for Chinese Patent Application No. 200780051876.7 (Mar. 7, 2012).
Applicant-Initiated Interview Summary for U.S. Appl. No. 12/621,190 (Feb. 7, 2012).
Notification of Transmittal of the International Search Report and the Written Opinion of the International Searching Authority, or the Declaration for International Application No. PCT/US2011/027427 (Nov. 15, 2011).
Notification of Transmittal of the International Search Report and the Written Opinion of the International Searching Authority, or the Declaration for International Application No. PCT/US2011/028520 (Oct. 31, 2011).
Notification of Transmittal of the International Search Report and the Written Opinion of the International Searching Authority, or the Declaration for International Application No. PCT/US2011/024753 (Oct. 28, 2011).
Notification of Transmittal of the International Search Report and the Written Opinion of the International Searching Authority, or the Declaration for International Patent Application No. PCT/US2010/061589 (Sep. 26, 2011).
Non-Final Official Action for U.S. Appl. No. 12/621,190 (Aug. 3, 2011).
Non-Final Official Action for U.S. Appl. No. 12/479,179 (Aug. 2, 2011).
Notification of Transmittal of the International Search Report and the Written Opinion of the International Searching Authority, or the Declaration for International Application No. PCT/US2010/043258 (Feb. 28, 2011).
Restriction Requirement for U.S. Appl. No. 12/479,179 (Feb. 8, 2011).
Final Official Action for U.S. Appl. No. 11/890,299 (Dec. 9, 2010).
"3rd Generation Partnership Project; Technical Specification Group Services and System Aspects; Telecommunication management; Charging management; Diameter charging applications (Release 9)," 3GPP TS 32.299 V9.4.0, pp. 1-148 (Jun. 2010).
Non-Final Official Action for U.S. Appl. No. 11/890,299 (Apr. 15, 2010).
"3rd Generation Partnership Project; Technical Specification Group Core Network and Terminals; Policy and Charging Control over Rx reference point (Release 9)," 3GPP TS 29.214 V9.3.0, pp. 1-45 (Mar. 2010).
"3rd Generation Partnership Project; Technical Specification Group Core Network and Terminals; Policy and Charging Control over Gx reference point (Release 9)," 3GPP TS 29.212 V9.2.0, pp. 1-111 (Mar. 2010).
"Universal Mobile Telecommunications System (UMTS); LTE; Policy and charging control over Rx reference point (3GPP TS 29.214 version 9.2.0 Release 9)," ETSI TS 129 214, V9.2.0 (Jan. 2010).
"Universal Mobile Telecommunications System (UMTS); LTE; Policy and charging control over Gx reference point (3GPP TS 29.212 version 9.1.0 Release 9)," ETSI TS 129 212, V9.1.0 (Jan. 2010).
Notification of Transmittal of the International Search Report and the Written Opinion of the International Searching Authority, or the Declaration for International Application No. PCT/US2009/046395 (Dec. 28, 2009).
"3rd Generation Partnership Project, Technical Specification Group Core Network and Terminals; Policy and Charging Control over Gx reference point (Release 9)," 3GPP TS 29.212 V9.1.0, pp. 1-106 (Dec. 2009).

Communication of European Publication Number and Information on the Application of Article 67(3) EPC for European Patent No. 2116021 (Oct. 14, 2009).
"Chapter 1: Overview of GPRS and UMTS," Cisco GGSN release 9.0 Configuration Guide, Cisco IOS Release 12.4(22)YE, pp. 1-1-1-16 (Aug. 4, 2009).
"Introduction to Diameter," Wikipedia, pp. 1-12 (Downloaded from the Internet on May 15, 2009).
"Diameter Credit-Control Application," Wikipedia, pp. 1-7 (Downloaded from the Internet on May 13, 2009).
"Diameter (Protocol)," Wikipedia, pp. 1-8 (Downloaded from the Internet on May 13, 2009).
"File: GPRS Core Structure.phg," Wikipedia, pp. 1-3 (Downloaded from the Internet on May 13, 2009).
"GPRS Core Network," Wikipedia, pp. 1-6 (Downloaded from the Internet on May 13, 2009).
Declaration of Gregory A. Hunt (Dec. 15, 2008).
"GPRS Network Architecture," DenMasBroto, pp. 1-2 (Downloaded from the Internet on May 13, 2009) (May 28, 2008).
Notification of Transmittal of the International Search Report and the Written Opinion of the International Searching Authority, or the Declaration for International Application No. PCT/US07/26232 (May 15, 2008).
"BICC Architecture and BICC Protocol Details," Tekelec, p. 28-41 (2008).
"BICC Signaling Router (BSR) Reference Architecture (WP005274)," Tekelec, p. 2-91 (2008).
Jennings et al., "Session Initiation Protocol (SIP) URIs for Application such as Voicemail and Interactive Voice Response (IVR)," The Internet Society, RFC 4458 (Apr. 2006).
Agilent Technologies, "Understanding DSLAM and BRAS Access Devices," White Paper, pp. 1-15 (2006).
Hakala et al., "Diameter Credit-Control Application," Network Working Group RFC 4006, pp. 1-114 (Aug. 2005).
"Interworking Between Session Initiation Protocol (SIP) and Bearer Independent Call Control Protocol or ISDN User Part," ITU-T Q.1912.5, p. 1-101 (Mar. 2004).
Zhou et al., "Prophet Address Allocation for Large Scale MANETs," Ad Hoc Networks, vol. 1, Issue 4, pp. 423-434 (Nov. 2003).
Calhoun et al., "Diameter Base Protocol," RFC 3588, pp. 1-147 (Sep. 2003).
"Prepaid vs. Number Portability," Power Point presentation (publication date unknown; electronic file creation date Jul. 29, 2003.).
"Bearer Independent Call Bearer Control Protocol," ITU-T Q.1950, p. 1-96 (Dec. 2002).
Chang, "BICC Extension of SIP in Inter-Network Configuration," Internet Engineering Task Force, draft-chang-sipping-bicc-network-00.txt, pp. 1-17 (Mar. 2002).
Ponnappan et al., "A Policy Based QoS Management System for the IntServ/DiffServ Based Internet," Policies for Distributed Systems and Networks, pp. 159-168 (2002).
Marshall et al., "SIP Extensions for Supporting Distributed Call State," SIP Working Group, Internet Draft, pp. 1-12 (Aug. 2001).
"Bearer Independent Call Control Protocol (Capability Set 2) and Signalling System No. 7 ISDN User Part: Formats and Codes," ITU-T Q.1902.3, p. 1-141 (Jul. 2001).
"Bearer Independent Call Control Protocol (Capability Set 2) and Signaling System No. 7 ISDN user part: General Functions of Messages and Parameters," ITU-T Q.1902.2, (Jul. 2001).
"Bearer Independent Call Control Protocol (Capability Set 2): Functonal Description," ITU-T Q.1902.1, p. 1-23 (Jul. 2001).
"Bearer Independent Call Control Protocol," ITU-T Q.1901 (Jun. 2000).
Sugano et al., "Presence Information Data Format for IMPP," Internet draft, draft-ietf-impp-pidf-01.text, Network Working Group, pp. 1-17 (Mar. 10, 2000).
Liao et al., "SS7-TCAP/IP Interworking," Internet Engineering Task Force, pp. 1-14 (Mar. 1999).
De Ment, "The Evolution of Signaling," NMS Communications, p. 1-28 (Publication Date Unknown).
"Mobile Wireless Overview," Cisco IOS Mobile Wireless Configuration Guide, pp. MWC-1-MWC-8 (Publication Date Unknown).

(56) References Cited

OTHER PUBLICATIONS

"GPRS Tutorial," MorganDoyle Limited, pp. 1-13 (Publication Date Unknown).
Notice of Granting Patent Right for Invention for Chinese Patent Application No. 200780051876.7 (Jun. 26, 2013).
Extended European Search Report for European Application No. 07867984.2 (Jun. 18, 2013).
Notice of Allowance and Fee(s) Due for U.S. Appl. No. 11/890,299 (Mar. 26, 2013).
Non-Final Office Action for U.S. Appl. No. 13/277,626 (Feb. 27, 2013).
Second Office Action for Chinese Patent Application No. 200780051876.7 (Dec. 5, 2012).
Notice of Allowance and Fee(s) Due for U.S. Appl. No. 12/479,179 (Jul. 9, 2013).
Interview Summary for U.S. Appl. No. 12/479,179 (Jul. 1, 2013).
Final Office Action for U.S. Appl. No. 13/048,597 (Jun. 21, 2013).
Non-Final Office Action for U.S. Appl. No. 13/157,052 (Jun. 6, 2013).
Final Office Action for U.S. Appl. No. 12/973,186 (May 22, 2013).
First Office Action for Chinese Patent Application No. 200980130515.0 (Apr. 24, 2013).
Non-Final Office Action for U.S. Appl. No. 13/048,607 (Mar. 4, 2013).
Final Office Action for U.S. Appl. No. 12/479,179 (Feb. 15, 2013).
Non-Final Office Action for U.S. Appl. No. 13/048,597 (Feb. 1, 2013).
Notice of Allowance and Fee(s) Due for U.S. Appl. No. 13/042,294 (Jan. 30, 2013).
Communication of European Publication Number and Information on the Application of Article 67(3) EPC for European Patent Application No. 11756855.0 (Jan. 4, 2013).
Notice of Allowance and Fee(s) Due for U.S. Appl. No. 12/621,190 (Dec. 27, 2012).
Communication of European Publication Number and Information on the Application of Article 67(3) EPC for European Patent Application No. 11751508.0 (Dec. 12, 2012).
Communication of European publication number and information on the application of Article 67(3) EPC for European Application No. 11742958.9 (Nov. 21, 2012).
Notice of Allowance and Fee(s) Due for U.S. Appl. No. 13/277,626 (Aug. 20, 2013).
Notice of Allowance and Fee(s) Due for U.S. Appl. No. 11/890,299 (Aug. 6, 2013).
Advisory Action Before the Filing of an Appeal Brief for U.S. Appl. No. 13/048,607 (Jan. 7, 2014).
Final Office Action for U.S. Appl. No. 13/157,052 (Jan. 2, 2014).
Second Office Action for Chinese Application No. 200980130515.0 (Dec. 10, 2013).
Final Office Action for U.S. Appl. No. 13/048,607 (Oct. 25, 2013).
Notice of Allowance and Fee(s) Due for U.S. Appl. No. 12/973,186 (Sep. 19, 2013).
Advisory Action Before the Filing of an Appeal Brief for U.S. Appl. No. 13/048,597 (Sep. 13, 2013).
Communication Under Rule 71(3) EPC for European Patent Application No. 09759499.8 (Aug. 14, 2013).
Non-Final Office Action for U.S. Appl. No. 13/024,967 (Aug. 5, 2013).
Letter Regarding Decision to grant a Chinese patent for Chinese Application No. ZL201180017408.4 (Dec. 2, 2014).
Letter Regarding Decision to grant a Chinese patent for Chinese Application No. ZL200980130515.0 (Dec. 2, 2014).
Advisory Action for U.S. Appl. No. 13/048,597 (Dec. 18, 2014).
Non-Final Office Action for U.S. Appl. No. 13/024,967 (Dec. 1, 2014).
Non-Final Office Action for U.S. Appl. No. 13/048,607 (Oct. 7, 2014).
Final Office Action for U.S. Appl. No. 13/048,597 (Oct. 6, 2014).
Notification of the First Office Action for Chinese Application No. 201180024178.4 (Sep. 25, 2014).
Notification of the Third Office Action for Chinese Application No. 200980130515.0 (Jun. 26, 2014).
Non-Final Office Action for U.S. Appl. No. 13/048,597 (Jun. 24, 2014).
Notification of the First Office Action for Chinese Application No. 201180013382.6 (Jun. 20, 2014).
Applicant-Initiated Interview Summary for U.S. Appl. No. 13/024,967 (Jun. 20, 2014).
Notification of the First Office Action for Chinese Application No. 201180017408.4 (Jun. 3, 2014).
Communication of extended European Search Report for European Patent Application No. 10841576.1 (May 9, 2014).
Notice of Allowance and Fee(s) Due for U.S. Appl. No. 13/157,052 (Apr. 14, 2014).
Applicant-Initiated Interview Summary and Advisory Action Before the Filing of an Appeal Brief for U.S. Appl. No. 13/157,052 (Mar. 17, 2014).
Non-Final Office Action for U.S. Appl. No. 13/024,967 (Mar. 7, 2014).
Decision to grant a European patent pursuant to Article 97(1) EPC for European Application No. 09759499.8 (Jan. 23, 2014).
Communication of European publication number and information on the application of Article 67(3) EPC for European Application No. 09759499.8 (Feb. 2, 2011).
First Examination Report for Indian Patent Application No. 447/CHENP/2009 (Nov. 24, 2014).
Communication under Rule 71(3) EPC for European Patent Application No. 07 867 964.2 (Oct. 22, 2014).
Final Office Action for U.S. Appl. No. 13/048,597 (Oct. 8, 2015).
Advisory Action for U.S. Appl. No. 13/048,607 (Sep. 21, 2015).
Second Office Action for Chinese Application No. 201180024178.4 (Jul. 22, 2015).
Notice of Allowance and Fee(s) Due for U.S. Appl. No. 13/024,967 (Jun. 18, 2015).
Non-Final Office Action for U.S. Appl. No. 13/048,597 (Jun. 18, 2015).
Final Office Action for U.S. Appl. No. 13/048,607 (May 11, 2015).
Office Action for Canadian Application No. 2,730,103 (Apr. 16, 2015).
Letter Regarding Decision to Grant for Chinese Patent Application No. ZL201180013382.6 (Mar. 9, 2015).

* cited by examiner

METHODS, SYSTEMS, AND COMPUTER READABLE MEDIA FOR PERFORMING PCRF-BASED USER INFORMATION PASS THROUGH

PRIORITY CLAIM

This application claims the benefit of U.S. Provisional Patent Application Ser. No. 61/313,953 filed Mar. 15, 2010; the disclosure of which is incorporated herein by reference in its entirety.

TECHNICAL FIELD

The subject matter described herein relates to Internet protocol connectivity access network (IP CAN) session information sharing. More specifically, the subject matter relates to methods, systems, and computer readable media for performing PCRF-based IP CAN session information pass-through.

BACKGROUND

A policy and charging rules function (PCRF) is an entity that uses network operator-defined service policies, subscription information, and other data to make policy decisions. A PCRF may aid network operators in making real-time, subscriber-specific policy decisions to provide varying levels of quality of service (QoS). As a central policy decision point for a network, a PCRF node may be privy to information that other nodes may not, such as user-related information, IP CAN session information, and long term evolution (LTE) network-related information.

An IP CAN is a network though which a user obtains IP connectivity. Examples of IP CAN networks include 3GPP access networks, such as GPRS or EDGE. Other examples include LTE access networks, WLAN access networks, and DSL networks. An IP CAN session is the connection of a user device to the access network for a specific purpose, such as a voice over IP telephone call, web browsing, audio or video downloading, etc. An IP CAN session is set up through signaling between the user device, the PCRF, a subscriber profile repository, and the network access node. At least some of this signaling may contain information that concerns details of the IP CAN session being established.

One node that may not have access to IP CAN session information is a deep packet inspection (DPI) node. A DPI node is a telecommunications entity that examines non-header information of IP packets for which the DPI node is not an endpoint. A DPI node may be employed by network operators for a wide variety of uses, e.g., anti-virus, spam filtering, intrusion detection, and gathering statistical information. However, in order to effectively and efficiently perform various deep packet inspection related functions, such as passive monitoring, active content filtering, web-optimization, or determining whether the traffic matches a policy and charging control (PCC) rule to be applied to the packet stream, a DPI node may require additional IP CAN session-related information, such as the identity, location, or type of device or subscriber associated with detected IP traffic.

One problem associated with conventional DPI node, PCRF, and access network-aware gateway operation is that DPI nodes are not typically aware of IP CAN session information that may be known by access network aware gateways and/or PCRFs. Moreover, current mechanisms do not allow DPI nodes to interact directly with access network aware gateways in order to obtain IP CAN session information.

Accordingly, in light of these difficulties, a need exists for improved methods, systems, and computer readable media for providing IP CAN session information known by access network-aware gateways to DPI nodes.

SUMMARY

Methods, systems, and computer readable media for performing PCRF-based IP CAN session information pass-through are disclosed. According to one method, a policy and charging rules function (PCRF) receives Internet protocol connectivity access network (IP CAN) session information from an access network-aware gateway. The PCRF forwards at least a portion of the IP CAN session information to a deep packet inspection (DPI) node.

A system for performing IP CAN session information pass-through is also disclosed. The system includes a policy and charging rules function (PCRF) node. The PCRF node includes a communications interface for receiving IP CAN session information from an access network-aware gateway. The PCRF further includes an IP CAN session information pass-through module configured to receive the IP CAN session information from the PCRF node and to forward at least a portion of the IP CAN session information to a deep packet inspection (DPI) node.

As used herein, the term "node" refers to a physical computing platform having one or more processors and associated memory.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

As mentioned above, it may be desirable to pass information from a GGSN or other access network-aware gateway (GW) to a DPI node. It may also be desirable in some circumstances to translate this information from its original format to a different format that is understood by the DPI. Therefore, the subject matter described herein addresses these needs by supporting DPI information flow, via a PCRF, between an access network-aware gateway, such as a GGSN, and a DPI node. In one embodiment, the PCRF may be configured to handle user-related data received from the GGSN as part of an IP CAN session and forward the information to the DPI node as part of an initial response. In other embodiments, the information may be forwarded to the DPI node at any time during the active user session. As used herein, an IP Connectivity Access Network (IP-CAN) refers to any access network that provides IP connectivity. In the cellular context, IP-CAN may refer to 3GPP access networks such as Long Term Evolution (LTE), Evolved Packet System (EPS), System Architecture Evolution (SAE), GPRS or EDGE, but may refer to WLAN or DSL networks. Thus, IP-CAN may be used to refer to any kind of IP-based access network without departing from the scope of the subject matter described herein. The functionality disclosed by the subject matter herein contrasts with the conventional functionality associated with a PCRF network element which is intended to generate policy and/or charging rules and communicate these rules to a GGSN or packet data network (PDN) gateway node.

Figure 1:
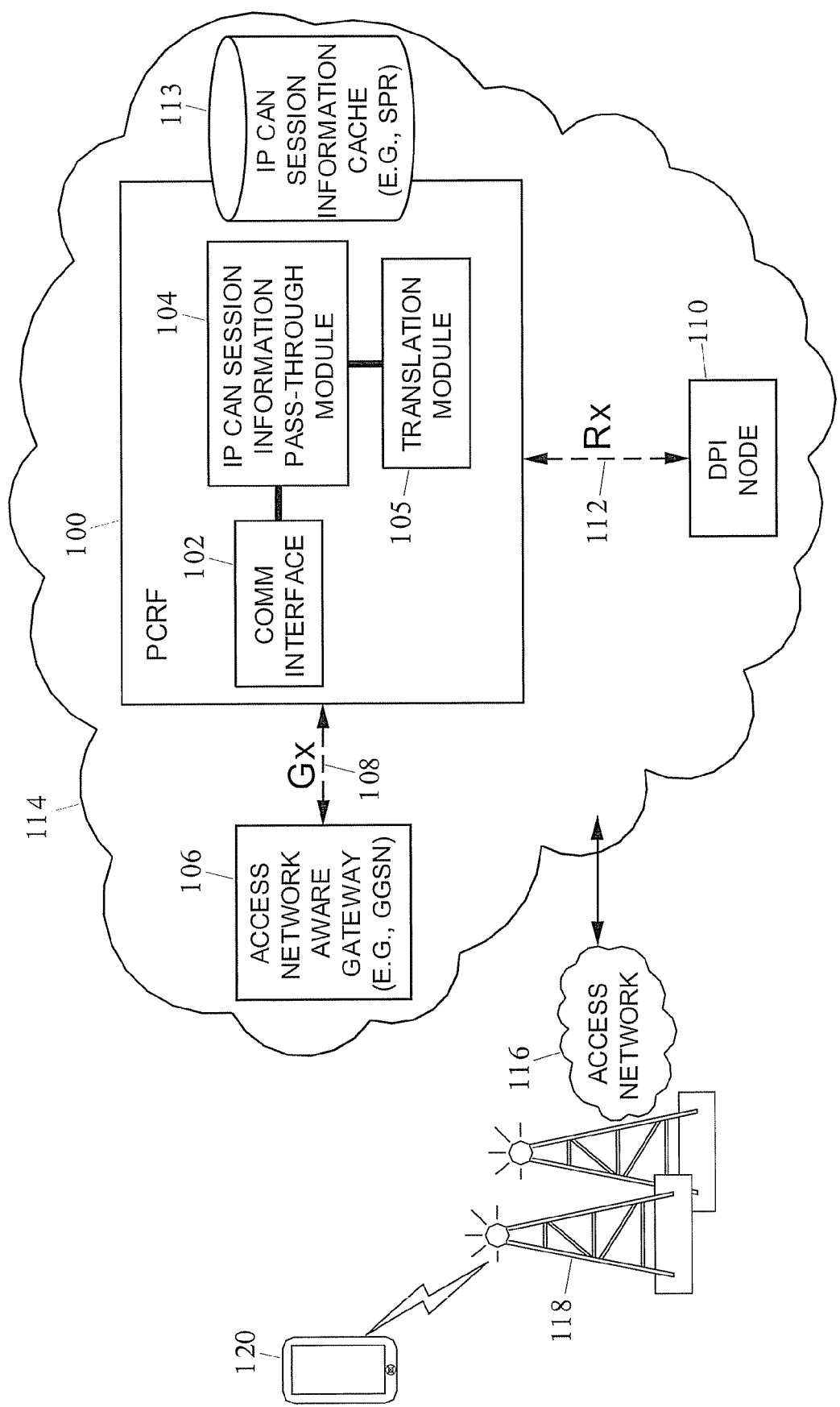
FIG. 1 is a block diagram illustrating an exemplary architecture of a policy control and enforcement function (PCRF) for performing PCRF-based IP CAN session information pass-through according to an embodiment of the subject matter described herein.

FIG. 1 is a block diagram illustrating an exemplary architecture of a policy control and enforcement function for performing PCRF-based IP CAN session information pass-through according to an embodiment of the subject matter described herein. Referring to FIG. 1, PCRF node 100 may be a centralized node that can act as a policy decision point for carrier network 114. Within the Internet protocol multimedia subsystem (IMS), PCRF node 100 may include a policy entity that forms the linkage between the service and transport layers. PCRF node 100 may collate subscriber and application data, authorize QoS resources, and instruct the transport plane on how to proceed with the underlying data traffic. PCRF node 100 may use operator-defined service policies, subscription information pertaining to a user, and other data in order to create and apply policy decisions (e.g., PCC rules).

Policy decisions may be formulated as policy control and charging (PCC) rules. A PCC rule may refer to set of information enabling the detection of a service data flow and providing parameters for policy control and/or charging control. PCC rules may contain information about user plane traffic expressed as a packet filter. A packet filter make take the form of an IP five-tuple specifying: (1) source IP address (es), (2) destination IP address(es), (3) source port number(s), (4) destination port number(s), and (5) application protocol (s) (e.g., transmission control protocol (TCP), user datagram protocol (UDP)).

PCRF node 100 may be connected on its northbound Rx interface to an application function (AF) (not shown), where an AF is a network element residing on the service plane representing applications that require dynamic policy and QoS control over the traffic plane behavior.

On the traffic plane, connected to PCRF node 100 via the southbound Gx interface, may be a policy and charging enforcement function (PCEF) (not shown). The PCEF's role may encompass traffic detection and policy enforcement. The PCEF may typically be located at a gateway node, which varies by transport layer (e.g. a GGSN, PDG etc.). It may be appreciated that as used herein, access network-aware gateway 106 may be interchangeably referred to as GGSN 106 for illustration and it not intended to limit access network-aware gateway 106 to only such an embodiment.

Internally, PCRF node 100 may include a communications interface 102 for sending and receiving messages via one or more interfaces. Communications interface 102 may be capable of communicating with other nodes via any suitable Diameter interface, such as a Gx interface, a Gxx interface, Gx lite, or Rx interface. The Gx lite protocol/interface is described in commonly owned, co-pending U.S. patent application Ser. No. 13/048,607 entitled Methods, Systems, and Computer Program Readable Media for Communicating Policy Information Between a Policy and Charging Rules Function and a Service Node filed on Mar. 15, 2011, the disclosure of which is incorporated herein by reference in its entirety. Additional modules within PCRF node 100 may further include IP CAN session information pass-through module 104, translation module 105, and IP CAN session information cache (e.g., subscription profile repository (SPR) node 113), each of which will be described in greater detail below.

IP CAN session information pass-through module 104 may be configured to obtain IP CAN session information associated with the IP address and forward the obtained IP CAN session information to DPI node 110. For example, PCRF node 100 may receive IP CAN session information included within a Diameter credit control request (CCR) message and forward the information in a re-authentication request (RAR) message. In other embodiments, PCRF node 100 may cache the IP CAN session information while awaiting a request for the IP CAN session information and may provide the requested IP CAN session information in, for example, a Diameter credit control answer (CCA) message. As specified in Internet Engineering Task Force (IETF) Request for Comments (RFC) 4006, the disclosure of which is incorporated by reference herein in its entirety, credit-control is a mechanism that directly interacts in real-time with an account and controls or monitors the charges related to the service usage. Credit-control is a process of checking whether credit is available, credit-reservation, and deduction of credit from the end user account when service is completed and refunding of reserved credit that is not used.

Alternatively, IP CAN session information pass-through module 104 may request the IP CAN session information directly from an access network-aware gateway, such as GGSN 106, in response to the request from DPI node 110. In such an embodiment, PCRF node 100 may not cache the IP CAN session information received from GGSN 106. This may be done in order to preserve storage resources associated with caching IP CAN session information for a large number of sessions. As such, when IP CAN session information is requested by DPI node 110 for a particular IP address, PCRF node 100 may directly request the information from access network-aware gateway 106 without consulting any dedicated IP CAN session information cache without departing from the scope of the subject matter described herein.

Translation module 105 may be configured to translate IP CAN session information passing through PCRF node 100 between access network-aware gateway 106 and DPI node 110 from a first format used or understood by GGSN 106 into a second format used or understood by DPI node 110. For example, PCRF node 100 could translate between the Gx and whatever interface is implemented between PCRF node 100 and DPI node 110. For example, the PCRF may communicate IP CAN session information to the DPI node using non-Diameter protocols such as extensible markup language (XML), simple object access protocol (SOAP), session initiation protocol (SIP), or other communication protocol that is capable of conveying the IP CAN session information.

Access network-aware gateway 106 may be connected to PCRF node 100 via any suitable Diameter interface. For example, a GGSN may be connected to PCRF node 100 via Gx interface 108, which is defined in 3GPP TS 29.212 and incorporated herein by reference in its entirety.

DPI node 110 may include any network node having DPI capability. DPI node 110 may inspect and process a packet's non-header information without being an endpoint for that packet. As mentioned above, DPI node 110 may perform either passive functions (e.g., monitoring) or active functions, such as performing content filtering or web-optimization (e.g., the reformatting of WEB content to more effectively conform and/or display on a particular type of handset or smartphone). DPI node 110 may communicate with PCRF node 100 via Rx interface 112.

IP CAN session information cache 113 may provide subscriber specific data to PCRF node 100 to assist in evaluating policy decisions. In one embodiment, the information may be stored at an SPR and indexed by IP address. IP CAN session information cache 113 may be co-located at, integrated with, or separate from PCRF node 100.

Carrier network 114 may communicate with access network 116 for reaching various endpoints, such as client devices (e.g., handsets). For example, access network 116 may include nodes, functions, devices, and/or components for providing user equipment (UE) 120 access to services, functions, or devices in one or more networks. In one embodiment, access network 116 may include a radio access network (RAN). Exemplary types of access network 116 may include a global system for mobile communications (GSM) RAN (GRAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an evolution-data optimized (EV-DO) network, a wideband CDMA (WCDMA) network, a high speed packet access (HPSA) network, an evolved HPSA (EHPSA+) network, a PICOcell, a FEMTOcell, or a long term evolution (LTE) access network. Access network 116 may include one or more transceiver nodes 118 for communicating with UE 102. UE 102 may include a computer, a pager, a mobile phone, a smartphone, a wireless modem, or other devices through which a subscriber accesses network services.

Figure 2:
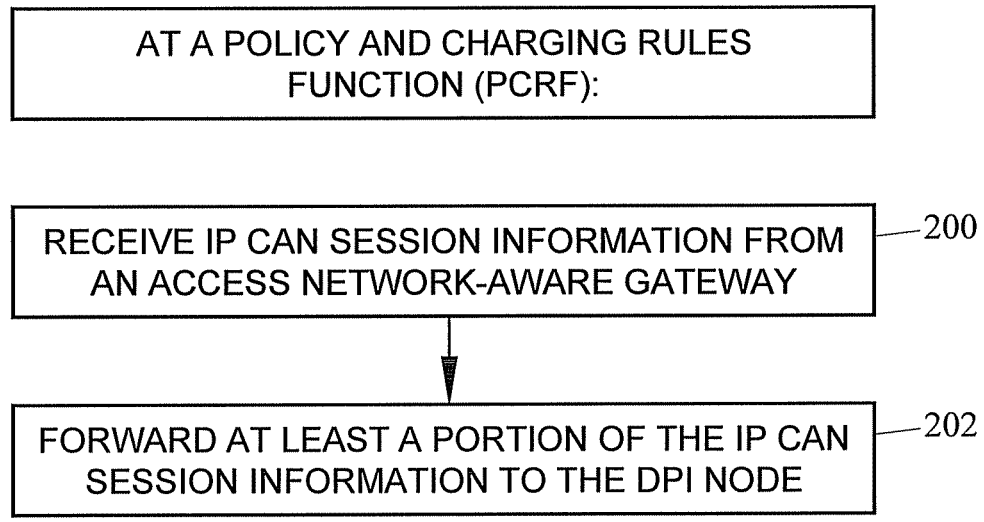
FIG. 2 is a flow chart illustrating exemplary steps for performing PCRF-based IP CAN session information pass-through according to an embodiment of the subject matter described herein.

FIG. 2 is a flow chart illustrating exemplary steps for performing PCRF-based IP CAN session information pass-through according to an embodiment of the subject matter described herein. Referring to FIG. 2, at step 200, IP CAN session information may be received, by the PCRF node, from an access network-aware gateway. IP CAN session information can include user identity, device identity, access network identifier, handset type, etc. IP CAN session information may be received in a variety of formats, including formats whose only and/or primary purpose may be for sharing IP CAN session information. However, for purposes of illustration herein, IP CAN session information may be included in messages having uses other than the sharing of IP CAN session information. For example, upon initiating a session, a user's handset (i.e., UE) may send an IP CAN session request to access network-aware gateway 106 requesting establishment of an IP CAN session. Access network-aware gateway 106 may then formulate a Diameter credit control request (CCR) message that includes the IP CAN session information and forward the CCR message to PCRF node 100 in order to determine any PCC rules to be applied for the call (e.g., whether the calling party is allowed to make the call). IP CAN session information included in the CCR message may include information such as a user identity, user location, access network identifier, and handset device type. It may be appreciated that, as used herein, IP CAN session information does not include PCC rules. Additional information regarding the routing and/or installation of PCC rules at a DPI, by a PCRF node, is described in the above-reference Patent Application entitled Methods, Systems, And Computer Program Readable Media For Communicating Policy Information Between a Policy and Charging Rules Function And a Service Node.

At step 202, at least a portion of the IP CAN session information received from the access network-aware gateway may be forwarded to the DPI node. For example, PCRF node 100 may immediately forward an exact copy of any message(s) received from access network-aware gateway 106 that contain IP CAN session information to DPI node 110. It may also be appreciated that PCRF node 100 may forward a subset (i.e., a portion) of the IP CAN session information received from access network-aware gateway 106. For example, PCRF node 100 may receive IP CAN session information including a location, access network type, and device type, and forward only the device type to DPI node 110.

In another embodiment, IP CAN session information may be provided to DPI node 110 using a query/response mechanism. For example, IP CAN session information associated with UE 120 may be obtained by PCRF node 100 by performing a lookup in IP CAN session information cache 113 based on an IP address associated with UE 120 provided by DPI node 110. Based on this lookup, PCRF node 100 may retrieve IP CAN session information associated with UE 120 and an active IP CAN session. For example, IP CAN session information may be obtained from IP CAN session information cache 113 and may be included in a CCA (or similar) message that is responsive to a CCR (or similar) message originated by DPI node 110.

In other embodiments, IP CAN session information may be retrieved from IP CAN session information cache 113 and forwarded to DPI node 110 at any time during the IP CAN session without requiring a request for the information from DPI node 110 (e.g., using a Diameter CCR-U message).

It may be appreciated that in addition to forwarding IP CAN session information without translation as described above, IP CAN session information received from access network-aware gateway 106 may be stored in a first format and that it may be desirable to translate this information into a second format that is understandable by DPI node 110. As such, the IP CAN session information obtained by PCRF node 100 from the access network-aware gateway 106 may be translated, at PCRF node 100, into a second format before being sent to DPI node 110.

In one embodiment, the IP CAN session information may be indexed by IP address. For example, the IP CAN session information may be stored at a subscription profile repository (SPR) that is indexed by IP address. It is appreciated that the SPR may be co-located at, integrated with, or separate from the PCRF node.

An IP address may be received from a deep packet inspection (DPI) node. For example, a CCR message may be sent by DPI node 110 to PCRF node 100 in response to detecting conditions satisfying one or more triggers installed on DPI node 110. Details of using DPI node triggers for initiating queries for IP CAN session information may be found in commonly owned, co-pending U.S. patent application Ser. No. 13/048,597 entitled Methods, Systems, and Computer Readable Media for Triggering a Service Node To Initiate a Session With a Policy and Charging Rules Function filed on Mar. 15, 2011, the disclosure of which is incorporated herein by reference in its entirety.

Figure 3:
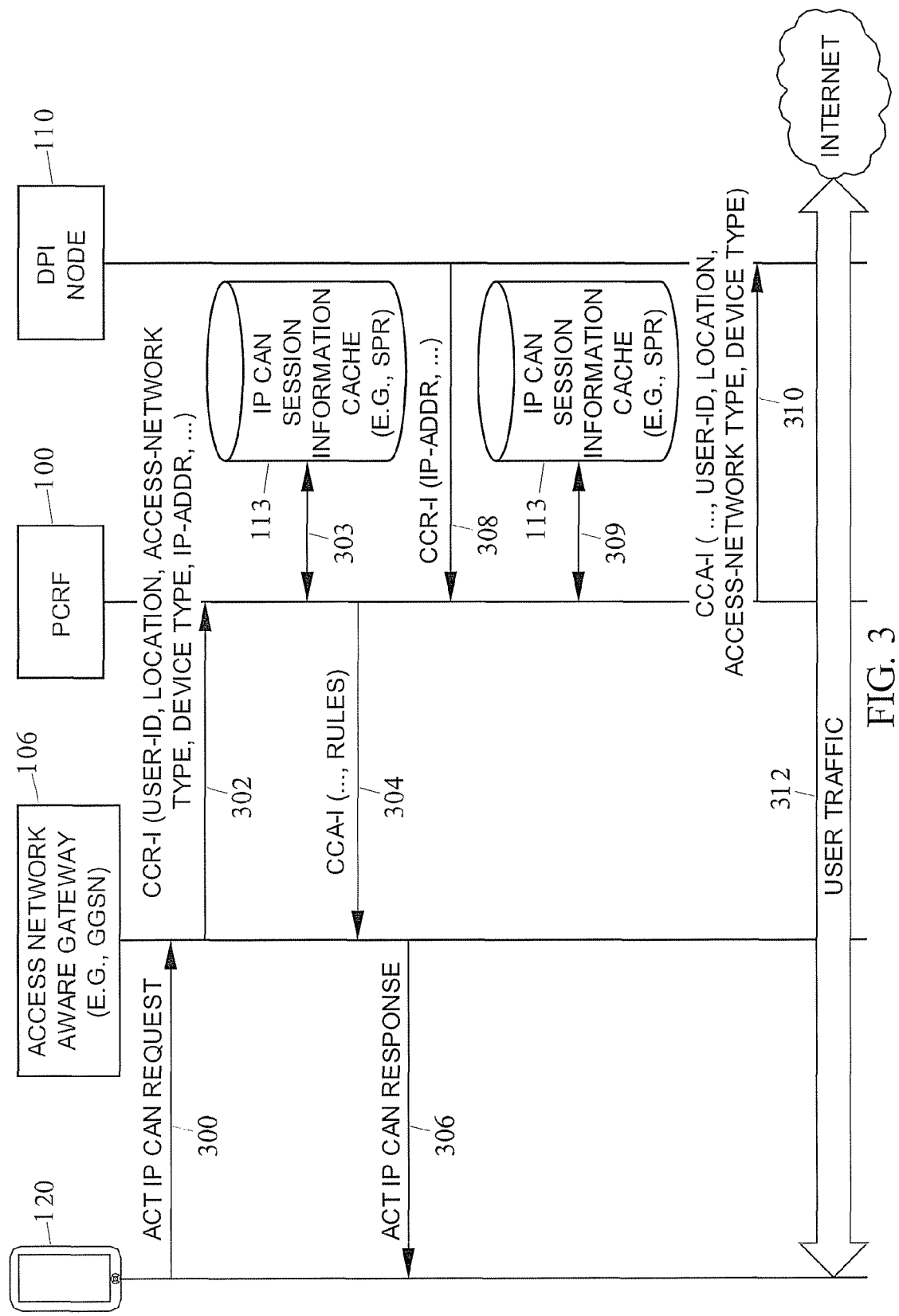
FIG. 3 is a call flow ladder diagram illustrating an exemplary use case for performing triggered PCRF-based IP CAN session information pass-through according to an embodiment of the subject matter described herein.

FIG. 3 is a call flow ladder diagram illustrating an exemplary use case for performing triggered PCRF-based IP CAN session information pass-through according to an embodiment of the subject matter described herein. As used herein, a "trigger" refers to one or more criteria that may be used to determine whether or not to forward IP CAN session information to DPI node 110. For example, PCRF node 100 may have a trigger such that IP CAN session information for a particular IP address or set of IP addresses may be forwarded. It may be appreciated that the trigger may be located internally (e.g., at PCRF node 100) or externally (e.g., at DPI node 110). FIG. 3 illustrates an embodiment where DPI node 110 triggers a request for IP CAN session information from PCRF node 100 based on observation of one or more packets associated with an active IP CAN session served by PCRF node 100.

At step 300, UE 120 may send Act IP CAN Request message to access network-aware gateway 106. At step 302, access network-aware gateway 106 may generate and send a CCR-I message to PCRF node 100 including the IP CAN session information (e.g., user identity, location, access network, and device type) extracted from Request message 300.

At step 303, PCRF node 100 may cache IP CAN session information sent by access network-aware gateway 106. For example, a user identity, user location, access network identifier, or handset device type may be extracted from the CCR-I message sent by access network-aware gateway 106 in step 302. It may be appreciated that in other embodiments, step 303 may be omitted and the IP CAN session information may not be cached. In such embodiments, PCRF node 100 may directly query access network-aware gateway 106 for IP CAN session information needed and/or requested by DPI node 110.

At step 304, PCRF node 100 may return a CCA-I message containing rules to access network-aware gateway 106. At step 306, access network-aware gateway 106 may return an Act IP CAN Response message corresponding to Act IP CAN Request message 300 to UE 120. It may be appreciated that steps 304 and 306 are shown for completeness as part of normal operation of PCRF node 100 and are not necessary for performing IP CAN session information pass-through.

At step 308, DPI node 110 may send a CCR-I message to PCRF node 100 that includes the IP address associated with the active IP CAN session. PCRF node 100 may interpret CCR-I message 308 as a request for IP CAN session information associated with the IP address.

At step 309, PCRF node 100 may perform a lookup in IP CAN session information cache 113 based on the IP address provided by DPI node 110 and locate any associated IP CAN session information. For example, PCRF node 100 may obtain the user identity (e.g., International Mobile Station Identifier (IMSI), Mobile Subscriber ISDN (MSISDN), Mobile Dial-able Number (MDN), etc.), user location (e.g., geo-location/GPS coordinate information, serving eNodeB identifier, serving Mobility Management Entity (MME) identifier, mobile country code (MCC), mobile network code (MNC), visited_PLMN_ID, etc.), access network identifier (e.g., Radio Access Type (RAT), etc.), and/or handset device type (e.g., International Mobile Equipment Identifier (IMEI), Operating System identifier, etc.) associated with the IP address.

At step 310, PCRF node 100 may return a CCA-I message containing the IP CAN session information to DPI node 110. It may be appreciated that, at and/or after this point in time, DPI node 110 may be aware of information about the user and may use this information for billing or any other purpose.

At step 312, user traffic may be exchanged with UE 120.

Figure 4:
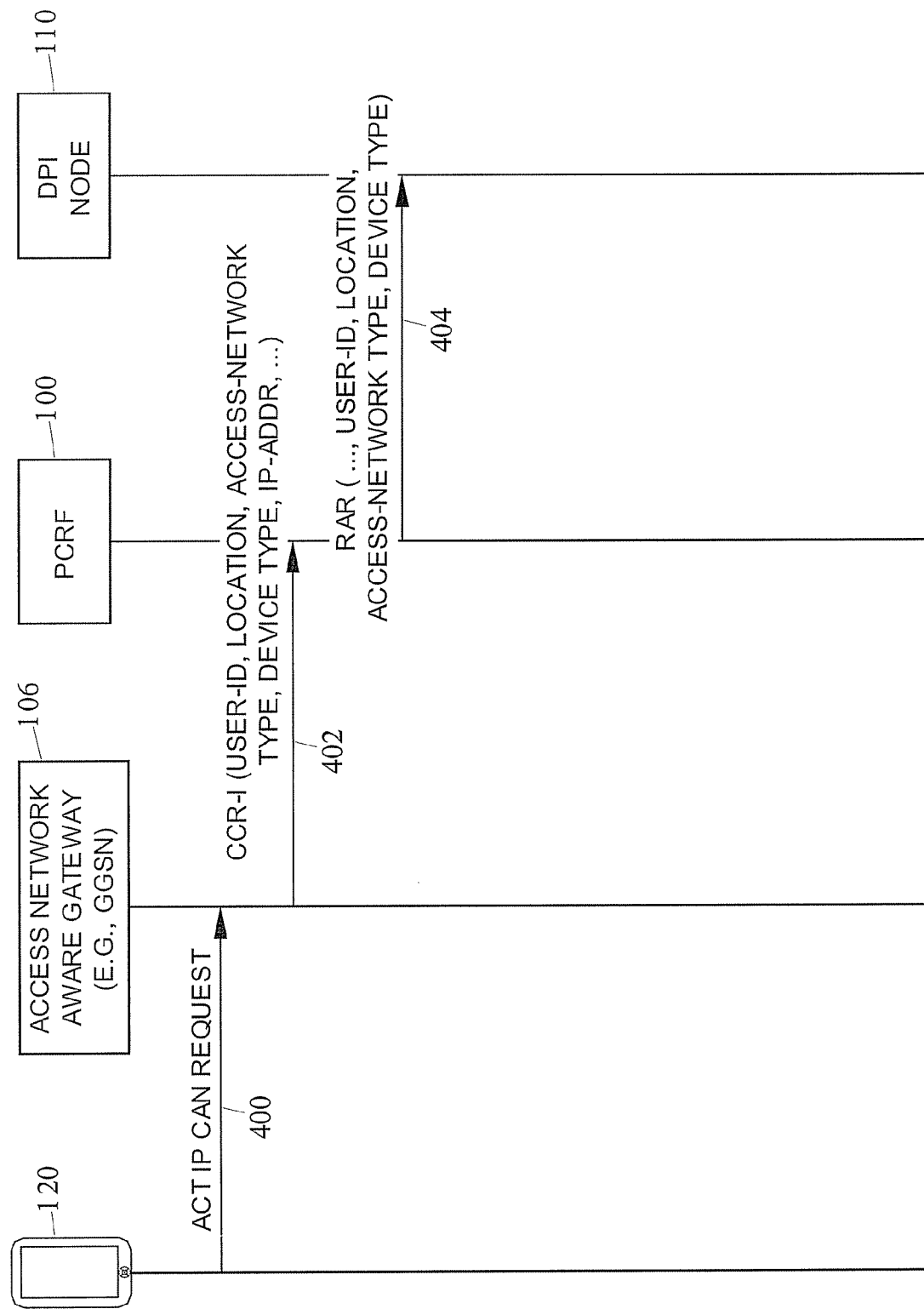
FIG. 4 is a call flow ladder diagram illustrating an exemplary use case for performing triggerless PCRF-based IP CAN session information pass-through according to an embodiment of the subject matter described herein.

FIG. 4 is a call flow ladder diagram illustrating an exemplary use case for performing triggerless PCRF-based IP CAN session information pass-through according to an embodiment of the subject matter described herein. As used herein, the term "triggerless" refers to the immediate and automatic forwarding of IP CAN session information, by PCRF node 100, to DPI node 110 that is not in response to receiving a request from DPI node 110 and without requiring a determination as to whether any criteria are met that would result in the IP CAN session information being forwarded or not forwarded to DPI node 110. In contrast to the triggered pass-through embodiment described above with respect to FIG. 3, in a triggerless embodiment IP CAN session information need not be cached, indexed, or retrieved. Referring to FIG. 4, at step 400, UE 120 may send an IP CAN session request message including IP CAN session information and an IP address associated with UE 120 to access network aware-gateway 106 for requesting/initiating an IP CAN session.

At step 402, access network aware-gateway 106 may generate and send a CCR-I message to PCRF node 100 that includes the IP CAN session information and the IP address for UE 120. At this point, it may be appreciated that PCRF node 100 knows everything that DPI node 110 may want to know in order to effectively and efficiently perform various deep packet inspection-related functions such as passive monitoring, active content filtering, web-optimization, etc. Additionally, PCRF node 100 may either forward an exact copy of the same type of message received from access network aware-gateway 106 or may reformat the message. For example, in the embodiment shown in FIG. 4, at step 404, PCRF node 100 may include the IP CAN session information in a Diameter re-authentication request (RAR) message that is sent to DPI node 110. It is also appreciated that PCRF node 100 may send other types of messages without departing from the scope of the subject matter described herein including, but not limited to, non-Diameter messages such as an extensible markup language (XML) message, a simple object access protocol (SOAP) message, and a session initiation protocol (SIP) message that includes the IP CAN session information. As mentioned above, PCRF node 100 may forward a subset (i.e., less than the all) of the IP CAN information received from access network-aware gateway 106. For example, PCRF node 100 may receive IP CAN session information including a location, access network type, and device type and may forward only the device type to DPI node 110.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing Internet protocol connectivity access network (IP CAN) session information pass-through, the method comprising:

at a policy and charging rules function (PCRF) node:
receiving IP CAN session information from an access network-aware gateway as part of establishing an IP CAN session, wherein the IP CAN session information comprises at least one of: user identity, user location, device identity, access network identifier, and handset type and wherein the IP CAN session information does not include policy and charging control (PCC) rules;
storing the IP CAN session information in an IP CAN session information cache;
performing, by the PCRF, IP CAN session lookup in the IP CAN session information cache based on an IP address provided by a deep packet inspection (DPI) node to locate the IP CAN session information; and
forwarding at least a portion of the IP CAN session information to the DPI node for use to perform DPI functions, and by receiving, storing, performing, and forwarding the IP CAN session information to the DPI node, the PCRF performs IP CAN session information pass-through;
wherein receiving the IP CAN session information includes receiving IP CAN session information in a first format and further comprising translating the IP CAN session information, at the PCRF, into a second format before forwarding the IP CAN session information to the DPI node.

2. The method of claim 1 wherein the IP CAN session information cache is accessible by the PCRF node.

3. The method of claim 2 wherein the stored IP CAN session information is associated with the IP address.

4. The method of claim 2 wherein storing the IP CAN session information includes storing the IP CAN session information at a subscription profile repository (SPR), at the PCRF node, or in a cache that is separate from the PCRF node.

5. The method of claim 1 wherein forwarding the at least a portion of the IP CAN session information to the DPI node comprises forwarding the information in response to determining, at the PCRF, that the DPI wishes to receive the IP CAN session information.

6. The method of claim 1 wherein forwarding the at least a portion of the IP CAN session information to the DPI node includes automatically forwarding a copy of a message including the IP CAN session information to the DPI node.

7. The method of claim 1 wherein forwarding the IP CAN session information includes sending the IP CAN session information at any time during an active user session and not in response to a request by the DPI node.

8. The method of claim 1 wherein the access network-aware gateway includes one of a gateway GPRS support node (GGSN) and a packet data network (PDN) gateway node.

9. A system for performing Internet protocol connectivity access network (IP CAN) session information pass-through, the system comprising:
an IP CAN session information cache for storing IP CAN session information, wherein the IP CAN session information does not include policy and charging control (PCC) rules; and
a policy and charging rules function (PCRF) node including:
a communications interface for receiving the IP CAN session information from an access network-aware gateway, wherein the IP CAN session information comprises at least one of: user identity, user location, device identity, access network identifier, and handset type, and for performing IP CAN session information cache lookup in the IP CAN session information cache based on an IP addressed provided by a deep packet inspection (DPI) node to locate the IP CAN session information; and
an IP CAN session information pass-through module for receiving the IP CAN session information from the communications interface and for forwarding at least a portion of the IP CAN session information to the DPI a node for use to perform DPI functions, and by receiving, storing, performing, and forwarding the IP CAN session information to the DPI node, the PCRF performs IP CAN session information pass-through;
wherein the communications interface is configured to receive the IP CAN session information in a first format and the PCRF node further comprises a translation module configured to translate the IP CAN session information into a second format before forwarding the IP CAN session information to the DPI node.

10. The system of claim 9 wherein the IP CAN session information cache is accessible by the PCRF node.

11. The system of claim 9 wherein the IP CAN session information cache is co-located with the PCRF node, is co-located with a subscription profile repository, or is located at a stand-alone node.

12. The system of claim 9 wherein the stored IP CAN session information is associated with the IP address.

13. The system of claim 9 wherein the IP CAN session information pass-through module is configured to forward the at least a portion of the IP CAN session information to the DPI node in response to determining, at the PCRF, that the DPI node wishes to receive the IP CAN session information.

14. The system of claim 9 wherein the IP CAN session information pass-through module is configured to forward a copy of a message containing the IP CAN session information received from the access network-aware gateway to the DPI node.

15. The system of claim 9 wherein the IP CAN session information pass-through module is configured to forward a subset of the IP CAN session information received from the access network-aware gateway to the DPI node.

16. The system of claim 9 wherein the IP CAN session information pass-through module is configured to send the IP CAN session information at any time during an active user session and not in response to a request by the DPI node.

17. The system of claim 9 wherein the access network-aware gateway includes one of a gateway GPRS support node (GGSN) and a packet data network (PDN) gateway node.

18. A non-transitory computer readable medium comprising computer executable instructions embodied in a non-transitory computer readable medium and when executed by a processor of a computer performs steps comprising:
at a policy and charging rules function (PCRF) node:
receiving IP CAN session information from an access network-aware gateway as part of establishing an IP CAN session, wherein the IP CAN session information comprises at least one of: user identity, user location, device identity, access network identifier, and handset type and wherein the IP CAN session information does not include policy and charging control (PCC) rules;
storing the IP CAN session information in an IP CAN session information cache;
performing, by the PCRF, IP CAN session lookup in the IP CAN session information cache based on an IP address provided by a deep packet inspection (DPI) node to locate the IP CAN session information; and
forwarding at least a portion of the IP CAN session information to the DPI node for use to perform DPI functions, and by receiving, storing, performing, and forwarding the IP CAN session information to the DPI node, the PCRF performs IP CAN session information pass-through;

wherein receiving the IP CAN session information includes receiving IP CAN session information in a first format and further comprising translating the IP CAN session information, at the PCRF, into a second format before forwarding the IP CAN session information to the DPI node.

* * * * *